US012710061B2

(12) United States Patent
Muraoka et al.

(10) Patent No.: US 12,710,061 B2
(45) Date of Patent: Aug. 18, 2026

(54) HYDRAULIC DRIVE DEVICE

(71) Applicant: KAWASAKI JUKOGYO KABUSHIKI KAISHA, Kobe (JP)

(72) Inventors: Hideyasu Muraoka, Kobe (JP); Nobuyuki Kinoshita, Kobe (JP); Yoji Yudate, Kobe (JP); Yoshihiko Hata, Kobe (JP); Yuki Kuwabara, Kobe (JP); Yuichi Miyagi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 5 days.

(21) Appl. No.: 18/877,421

(22) PCT Filed: May 23, 2023

(86) PCT No.: PCT/JP2023/019118

§ 371 (c)(1),
(2) Date: Dec. 20, 2024

(87) PCT Pub. No.: WO2023/248681

PCT Pub. Date: Dec. 28, 2023

(65) Prior Publication Data

US 2026/0022712 A1 Jan. 22, 2026

(30) Foreign Application Priority Data

Jun. 23, 2022 (JP) ................................. 2022-101450

(51) Int. Cl.
*F15B 11/024* (2006.01)
*F15B 11/042* (2006.01)
(Continued)

(52) U.S. Cl.
CPC ........ *F15B 11/024* (2013.01); *F15B 11/0423* (2013.01); *F15B 21/087* (2013.01);
(Continued)

(58) Field of Classification Search
CPC .... F15B 2211/20515; F15B 2211/6343; F15B 2211/20546; F15B 2211/3058;
(Continued)

(56) References Cited

U.S. PATENT DOCUMENTS 9,206,584 B2 12/2015 Kawaguchi
9,279,236 B2 * 3/2016 Zhang .................. E02F 9/2292
(Continued)

FOREIGN PATENT DOCUMENTS

JP 2008157407 A 7/2008
JP 2011149473 A 8/2011
(Continued)

*Primary Examiner* — Dominick L Plakkoottam
(74) *Attorney, Agent, or Firm* — Alleman Hall LLP

(57) ABSTRACT

This hydraulic drive device drives a hydraulic cylinder by supplying and draining a working fluid to and from a head-end port and a rod-end port and includes: a hydraulic pump motor is rotatably driven by and discharges the working fluid; an electric motor connected to the hydraulic pump motor; a directional control valve that switches the direction of the working fluid flowing between the hydraulic pump motor and the head-end port; a regeneration valve that opens and closes a regeneration passage connecting the head-end port and the rod-end port; a temperature sensor that measures the coil temperature of the electric motor; and a control device that controls the opening of the regeneration valve according to the coil temperature measured by the temperature sensor when causing the regeneration valve to open the regeneration passage and causing the directional control valve to connect the head-end port and the hydraulic pump motor.

12 Claims, 5 Drawing Sheets

(51) Int. Cl.
*F15B 21/08* (2006.01)
*F15B 21/14* (2006.01)

(52) U.S. Cl.
CPC ....... *F15B 21/14* (2013.01); *F15B 2011/0246* (2013.01); *F15B 2211/20515* (2013.01); *F15B 2211/20569* (2013.01); *F15B 2211/3058* (2013.01); *F15B 2211/633* (2013.01); *F15B 2211/6343* (2013.01); *F15B 2211/66* (2013.01); *F15B 2211/665* (2013.01); *F15B 2211/6654* (2013.01); *F15B 2211/6656* (2013.01)

(58) Field of Classification Search
CPC ........ F15B 2211/7053; F15B 2211/327; F15B 2211/426; F15B 2211/6654; F15B 19/005; F15B 2211/27; F15B 13/028; F15B 21/008; F15B 21/042; F15B 21/045; F15B 2211/855; F15B 2211/665; F15B 2211/865; F15B 2211/8636; F15B 2211/86; F15B 11/024; F15B 11/0423; F15B 21/087; F15B 21/14; F15B 2011/0246; F15B 2211/20569; F15B 2211/45; F15B 2211/633; F15B 2211/6333; F15B 2211/6346; F15B 2211/66; F15B 2211/6651; F15B 2211/6656
See application file for complete search history.

(56) References Cited

U.S. PATENT DOCUMENTS

| | | | | |
|---|---|---|---|---|
| 2003/0097837 | A1* | 5/2003 | Hiraki | F15B 21/08 60/486 |
| 2007/0295005 | A1* | 12/2007 | Fleischmann | E02F 9/226 60/468 |
| 2015/0068504 | A1* | 3/2015 | Hatano | F02M 26/54 123/568.26 |
| 2017/0184139 | A1* | 6/2017 | Bhaskar | E02F 9/2289 |
| 2018/0266415 | A1* | 9/2018 | Afshari | F15B 15/18 |
| 2020/0123739 | A1* | 4/2020 | Lizotte | F16H 61/4043 |
| 2021/0262201 | A1* | 8/2021 | Saitoh | E02F 9/2289 |
| 2022/0333349 | A1* | 10/2022 | Nakamura | F15B 20/004 |
| 2023/0228063 | A1 | 7/2023 | Kondo et al. | |

FOREIGN PATENT DOCUMENTS

| | | | |
|---|---|---|---|
| JP | 2013068011 | A | 4/2013 |
| JP | 5515087 | B2 | 6/2014 |
| JP | 2021181789 | A | 11/2021 |
| WO | 2021225645 | A1 | 11/2021 |

* cited by examiner

HYDRAULIC DRIVE DEVICE

TECHNICAL FIELD

The present disclosure relates to a hydraulic drive device that supplies and drains a working fluid to and from each of a head-end port and a rod-end port of a hydraulic cylinder.

BACKGROUND ART

For example, a hydraulic drive device such as that disclosed in Patent Literature (PTL) 1 is known as a hydraulic drive device that drives a hydraulic cylinder. In the hydraulic drive device such as that disclosed in PTL 1, a hydraulic pump motor is rotatably driven by working oil drained from a head-end port of a boom cylinder in a boom lowering operation. Thus, the potential energy of a boom can be regenerated as electrical energy.

CITATION LIST

Patent Literature

PTL 1: Japanese Laid-Open Patent Application Publication No. 2021-181789

SUMMARY OF INVENTION

Technical Problem

In the hydraulic drive device disclosed in PTL 1, when an electric motor continuously performs a regenerative operation, the coil temperature of the electric motor increases. If the coil temperature of the electric motor increases excessively, the life expectancy of the electric motor is reduced. Therefore, in order to minimize the reduction in the life expectancy of the electric motor, there is a demand to prevent an excessive increase in the coil temperature.

Thus, an object of the present disclosure is to provide a hydraulic drive device in which the coil temperature of an electric motor can be kept from increasing during regeneration.

Solution to Problem

A hydraulic drive device according to the present disclosure drives a hydraulic cylinder by supplying and draining a working fluid to and from each of a head-end port and a rod-end port of the hydraulic cylinder and includes: a hydraulic pump motor that discharges the working fluid and is rotatably driven by the working fluid supplied to the hydraulic pump motor; an electric motor connected to the hydraulic pump motor; a directional control valve that switches a direction of the working fluid flowing between the hydraulic pump motor and the head-end port; a regeneration valve that opens and closes a regeneration passage connecting the head-end port and the rod-end port; a temperature sensor that measures a coil temperature of the electric motor; and a control device that controls an operation of each of the directional control valve and the regeneration valve. The control device controls an opening degree of the regeneration valve according to the coil temperature measured by the temperature sensor when causing the regeneration valve to open the regeneration passage and causing the directional control valve to connect the head-end port and the hydraulic pump motor.

According to the present disclosure, the opening degree of the regeneration valve is controlled according to the coil temperature. Therefore, it is possible to cause an energy loss at the regeneration valve before the coil temperature increases excessively by energy regeneration. This prevents an excessive increase in the coil temperature of the electric motor.

Advantageous Effects of Invention

According to the present disclosure, it is possible to prevent an increase in the coil temperature of the electric motor during regeneration.

The above object, other objects, features, and advantages of the present invention will be made clear by the following detailed explanation of preferred embodiments with reference to the attached drawings.

DESCRIPTION OF EMBODIMENTS

Hereinafter, hydraulic drive devices 1, 1A according to Embodiments 1 and 2 of the present disclosure will be described with reference to the aforementioned drawings. Note that the concept of directions mentioned in the following description is used for the sake of explanation; the orientations, etc., of elements according to the invention are not limited to these directions. Each of the hydraulic drive devices 1, 1A described below is merely one embodiment of the present disclosure. Thus, the present disclosure is not limited to the embodiments and may be subject to addition, deletion, and alteration within the scope of the essence of the invention.

Embodiment 1

Figure 1:
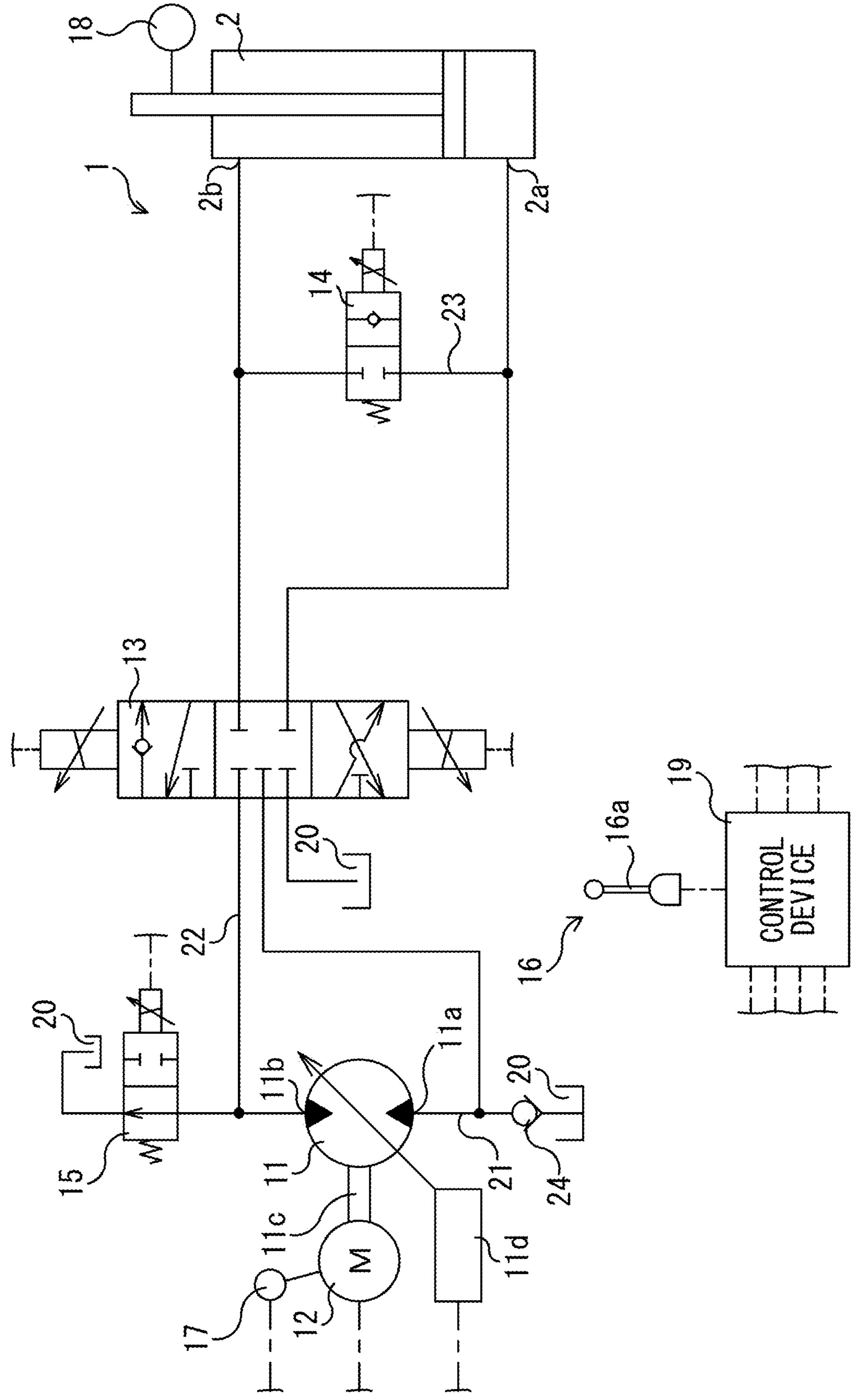
FIG. 1 is a circuit diagram illustrating the configuration of a hydraulic drive device according to Embodiment 1 of the present disclosure.

The hydraulic drive device 1 illustrated in FIG. 1 is included, for example, in a work vehicle (not illustrated in the drawings). Examples of the work vehicle include construction vehicles such as hydraulic excavators and hydraulic cranes and industrial vehicles such as forklifts. In the present embodiment, the work vehicle is a hydraulic excavator. The hydraulic excavator includes a boom, an arm, and an attachment (for example, a bucket). The hydraulic excavator can perform various tasks by moving the boom, the arm, and the attachment (for example, the bucket). The hydraulic excavator includes a boom cylinder 2.

The boom cylinder 2, which is one example of the hydraulic cylinder, includes a head-end port 2*a* and a rod-end port 2*b*. The boom cylinder 2 is provided on the boom.

The boom cylinder 2 is extended and retracted to move the boom. The boom cylinder 2 is driven when the working fluid (for example, liquid such as oil or water) is supplied and drained to and from each of the head-end port 2*a* and the rod-end port 2*b*. More specifically, the boom cylinder 2 is extended when the working fluid is supplied to the head-end port 2*a* and drained from the rod-end port 2*b*. As a result, the boom moves upward. On the other hand, the boom cylinder 2 is retracted when the working fluid is drained from the head-end port 2*a* and supplied to the rod-end port 2*b*. As a result, the boom moves downward. Note that the boom cylinder 2 is under the empty weight of the boom in a retracting direction in the present embodiment. Therefore, the boom cylinder 2 under the empty weight of the boom causes the working fluid to be drained from the head-end port 2*a* and draws in the working fluid through the rod-end port 2*b*; thus, the boom cylinder 2 is retracted.

<Hydraulic Drive Device>

More specifically, the hydraulic drive device 1 supplies and drains the working fluid to and from each of the head-end port 2*a* and the rod-end port 2*b*. Thus, the hydraulic drive device 1 drives the boom cylinder 2. In the present embodiment, the hydraulic drive device 1 extends and retracts the boom cylinder 2. Furthermore, the hydraulic drive device 1 regenerates energy using the working fluid that is drained from the head-end port 2*a* of the boom cylinder 2. The hydraulic drive device 1 that functions as just described includes a hydraulic pump motor 11, an electric motor 12, a directional control valve 13, a regeneration valve 14, and an unloader valve 15. Furthermore, the hydraulic drive device 1 includes an operation device 16, a temperature sensor 17, a stroke sensor 18, and a control device 19.

<Hydraulic Pump Motor>

The hydraulic pump motor 11 includes a suction port 11*a* and a discharge port 11*b*. The hydraulic pump motor 11 further includes a shaft 11*c*. The suction port 11*a* is connected to a tank 20 via a suction passage 21. Note that a check valve 24 is interposed in the suction passage 21. The check valve 24 allows the flow of the working fluid from the tank 20 to the suction port 11*a* and blocks the opposite flow of the working fluid.

When the shaft 11*c* is rotatably driven, the hydraulic pump motor 11 operates as follows. Specifically, the hydraulic pump motor 11 draws in the working fluid through the suction port 11*a*. Furthermore, the first hydraulic pump motor 11 discharges the working fluid from the discharge port 11*b*. On the other hand, when the working fluid is supplied to the suction port 11*a*, the hydraulic pump motor 11 causes rotation of the shaft 11*c*. Subsequently, the hydraulic pump motor 11 discharges the working fluid from the discharge port 11*b*. In the present embodiment, the hydraulic pump motor 11, which is a swash plate pump of the variable capacity type, includes a regulator 11*d*. The regulator 11*d* changes the tilt angle of the swash plate on the basis of a capacity command that is input to the regulator 11*d*. As a result, the piston capacity of the hydraulic pump motor 11 changes. This means that the hydraulic pump motor 11 can change a discharge flow rate and a suction flow rate.

<Electric Motor>

The electric motor 12 is connected to the hydraulic pump motor 11. More specifically, the electric motor 12 is coupled to the shaft 11*c*. The electric motor 12 rotatably drives the hydraulic pump motor 11 to discharge the working fluid from the hydraulic pump motor 11. More specifically, the electric motor 12 rotatably drives the shaft 11*c* to discharge the working fluid from the discharge port 11*b*. Furthermore, the electric motor 12 generates electric power by rotation of the hydraulic pump motor 11 (more specifically, the shaft 11*c*) when supplied with the working fluid. In other words, the electric motor 12 works with the hydraulic pump motor 11 to regenerate the fluid energy of the working fluid as electrical energy. Moreover, the electric motor 12 changes the rotational speed (more specifically, the rotational speed of the shaft 11*c*) according to a rotational speed command that is input to the electric motor 12.

<Directional Control Valve>

The directional control valve 13 switches the direction of the working fluid flowing between the hydraulic pump motor 11 and the head-end port 2*a*. The directional control valve 13 is connected to each of the suction port 11*a* and the discharge port 11*b* of the hydraulic pump motor 11. More specifically, the directional control valve 13 is connected on the side of the suction port 11*a* of the hydraulic pump motor 11 with respect to the check valve 24 in the suction passage 21. Furthermore, the directional control valve 13 is connected to the discharge port 11*b* via a discharge passage 22. Furthermore, the directional control valve 13 is connected to the head-end port 2*a* of the boom cylinder 2. Moreover, the directional control valve 13 is connected to the rod-end port 2*b* of the boom cylinder 2 and the tank 20.

The directional control valve 13 switches the connection target of the head-end port 2*a* between the discharge port 11*b* and the suction port 11*a* according to an operation command that is input to the directional control valve 13. Furthermore, when connecting the head-end port 2*a* to the discharge port 11*b*, the directional control valve 13 connects the rod-end port 2*b* to the tank 20. On the other hand, when connecting the head-end port 2*a* to the suction port 11*a*, the directional control valve 13 connects the rod-end port 2*b* to the discharge port 11*b*. Note that when connecting the rod-end port 2*b* to the discharge port 11*b*, the directional control valve 13 allows the flow of the working fluid from the discharge port 11*b* to the rod-end port 2*b* and blocks the opposite flow of the working fluid. Furthermore, when connecting the head-end port 2*a* to the suction port 11*a*, the directional control valve 13 controls the opening degree between the head-end port 2*a* and the suction port 11*a* (hereinafter also referred to as "the opening degree of the directional control valve 13") according to the operation command. In the present embodiment, the directional control valve 13 is an electric spool valve. Note that the directional control valve 13 is not limited to the electric spool valve.

<Regeneration Valve>

The regeneration valve 14 opens and closes a regeneration passage 23 connecting the head-end port 2*a* and the rod-end port 2*b*. The regeneration valve 14 is interposed in the regeneration passage 23. The regeneration valve 14 opens and closes the regeneration passage 23 according to a regeneration command. Furthermore, with the regeneration passage 23 open, the regeneration valve 14 allows the flow of the working fluid in a regeneration direction and blocks the opposite flow of the working fluid. The regeneration direction refers to the direction of the flow from the head-end port 2*a* to the rod-end port 2*b*. Thus, the second regeneration valve 14 regenerates, to the rod-end port 2*b*, the working fluid drained from the head-end port 2*a*. The regeneration valve 14 reduces the opening degree according to the regeneration command. The regeneration valve 14 is an electromagnetic proportional control valve, for example.

<Unloader Valve>

The unloader valve 15 connects, to the tank 20, the discharge passage 22 connecting the discharge port 11*b* and the directional control valve 13. More specifically, the unloader valve 15 connects the discharge passage 22 to the tank 20 according to an unloading command that is input to the unloader valve 15. Thus, the hydraulic pump motor 11 can be unloaded. In the present embodiment, the unloader valve 15 is a solenoid on-off valve. Note that the unloader valve 15 may be an electromagnetic proportional control valve having a controllable opening degree.

<Operation Device>

The operation device 16 is for operating the boom (more specifically, the boom cylinder 2). The operation device 16 includes an operation lever 16*a*. The operation lever 16*a* is configured to be operable. The operation device 16 outputs an operation signal corresponding to an operation direction and an operation amount of the operation lever 16*a*. The operation device 16 is an electric joystick, for example. Note that the operation device 16 may be a pilot operation valve. In this case, the operation device 16 outputs an operation signal corresponding to the output pressure of the pilot operation valve. Alternatively, the operation device 16 may be a touch panel. In this case, the operation device 16 outputs an operation signal according to an operation that is input thereto, a program, or the like.

<Temperature Sensor>

The temperature sensor 17 measures the coil temperature of the electric motor 12. More specifically, the temperature sensor 17 directly or indirectly measures the coil temperature of the electric motor 12. In the present embodiment, the temperature sensor 17 is provided on the casing of the electric motor 12. The temperature sensor 17 indirectly measures the coil temperature by measuring the temperature of the casing of the electric motor 12. Furthermore, the temperature sensor 17 outputs the measured temperature of the casing of the electric motor 12.

<Stroke Sensor>

The stroke sensor 18, which is one example of the speed-related sensor, is a sensor for measuring the speed of the boom cylinder 2. More specifically, the stroke sensor 18 measures the stroke length of the boom cylinder 2. Subsequently, the stroke sensor 18 outputs the measured stroke length. Note that the speed-related sensor may be a speed sensor, an acceleration sensor, an angle sensor, and an inertial measurement unit (abbreviated as IMU); it is sufficient that the speed-related sensor be a sensor capable of calculating the speed of the boom cylinder 2 on the basis of other measurement results. Note that the speed sensor measures the speed of the stroke of the boom cylinder 2. The acceleration sensor measures the acceleration of the stroke of the boom cylinder 2. The angle sensor measures the angle of the boom. The IMU measures the acceleration and the rotational speed of the boom.

<Control Device>

The control device 19 controls the operation of each of the directional control valve 13, the regeneration valve 14, and the unloader valve 15 according to the operation signal that is input to the control device 19. More specifically, the control device 19 outputs the operation command, the regeneration command, and the unloading command each of which corresponds to the operation signal, thereby controlling the operations of the directional control valve 13, the regeneration valve 14, and the unloader valve 15. Thus, the control device 19 controls the flow of the working fluid in the hydraulic drive device 1. Furthermore, the control device 19 controls the operation of each of the hydraulic pump motor 11 and the electric motor 12 according to the operation signal. More specifically, the control device 19 outputs the capacity command and the rotational speed command each of which corresponds to the operation signal, thereby controlling the operations of the hydraulic pump motor 11 and the electric motor 12. Thus, the control device 19 controls the discharge flow rate and the suction flow rate at the hydraulic pump motor 11.

Furthermore, the control device 19 changes the discharge flow rate and the suction flow rate at the hydraulic pump motor 11 according to the measurement result of the stroke sensor 18 in the present embodiment. Thus, the control device 19 performs the feedback control of the speed or the acceleration (in the present embodiment, the speed) of the boom cylinder 2. Moreover, the control device 19 controls the operation of each of the directional control valve 13 and the regeneration valve 14 on the basis of the coil temperature measured by the temperature sensor 17. More specifically, the control device 19 controls the opening degree of each of the directional control valve 13 and the regeneration valve 14 on the basis of the coil temperature measured by the temperature sensor 17.

<Operation of Hydraulic Drive Device>

In the hydraulic drive device 1, when the operation device 16 is operated (in the present embodiment, when the operation lever 16*a* is operated), the operation device 16 outputs the operation signal. The control device 19 controls the operation of each of the directional control valve 13, the regeneration valve 14, and the unloader valve 15 according to the operation signal. Furthermore, the control device 19 controls the operation of each of the electric motor 12 and the hydraulic pump motor 11 according to the operation signal and the measurement result of the stroke sensor 18. Thus, the control device 19 extends and retracts the boom cylinder 2 in a direction and at a speed that correspond to the operation signal (in the present embodiment, the operation direction and the operation amount of the operation lever 16*a*). In the hydraulic drive device 1, when lowering the boom (in other words, when retracting the boom cylinder 2), part of the working fluid drained from the head-end port 2*a* of the boom cylinder 2 is regenerated to the rod-end port 2*b* of the boom cylinder 2. Furthermore, in the hydraulic drive device 1, the remaining part of the working fluid drained from the head-end port 2*a* is used for energy regeneration. Moreover, the control device 19 controls the opening degree of each of the directional control valve 13 and the regeneration valve 14 on the basis of the coil temperature of the electric motor 12. This prevents an excessive increase in the coil temperature of the electric motor 12.

Figure 2:
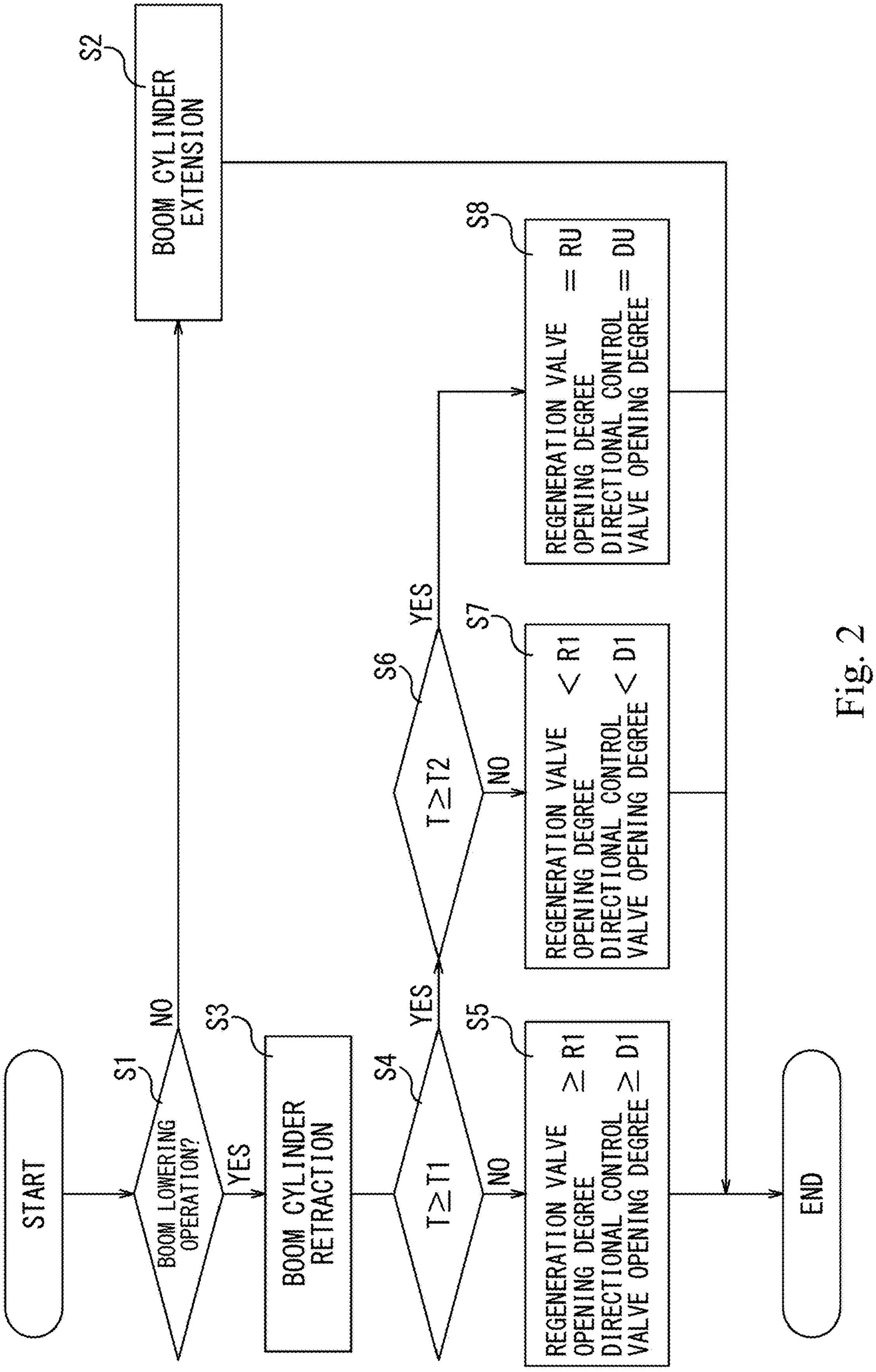
FIG. 2 is a flowchart illustrating the steps of a boom cylinder extension and retraction process performed by the hydraulic drive device illustrated in FIG. 1.

Hereinafter, a boom cylinder extension and retraction process in which the boom cylinder 2 is extended and retracted will be described in a greater detail with reference to the flowchart illustrated in FIG. 2. In the hydraulic drive device 1, when the operation device 16 is operated in order to extend and retract the boom cylinder 2, the operation device 16 outputs the operation signal. Thus, the boom cylinder extension and retraction process starts, and the processing transitions to Step S1. In Step S1, which is a boom lowering operation determination step, the control device 19 determines whether the operation performed on the operation device 16 is a boom lowering operation (that is, an operation to retract the boom cylinder 2). More specifically, the control device 19 detects an operation direction of the operation lever 16*a* on the basis of the operation signal. Subsequently, according to the operation direction of the operation lever 16*a*, the control device 19 determines whether the operation performed is the boom lowering operation. For example, when the operation lever 16*a* is operated in a first direction, the control device 19 determines that the operation performed is a boom raising operation. As a result, the processing transitions to Step S2. On the other hand, when the operation lever 16*a* is operated in a second direction, the control device 19 determines that the operation performed is a boom lowering operation. As a result, the processing transitions to Step S3.

Figure 3:
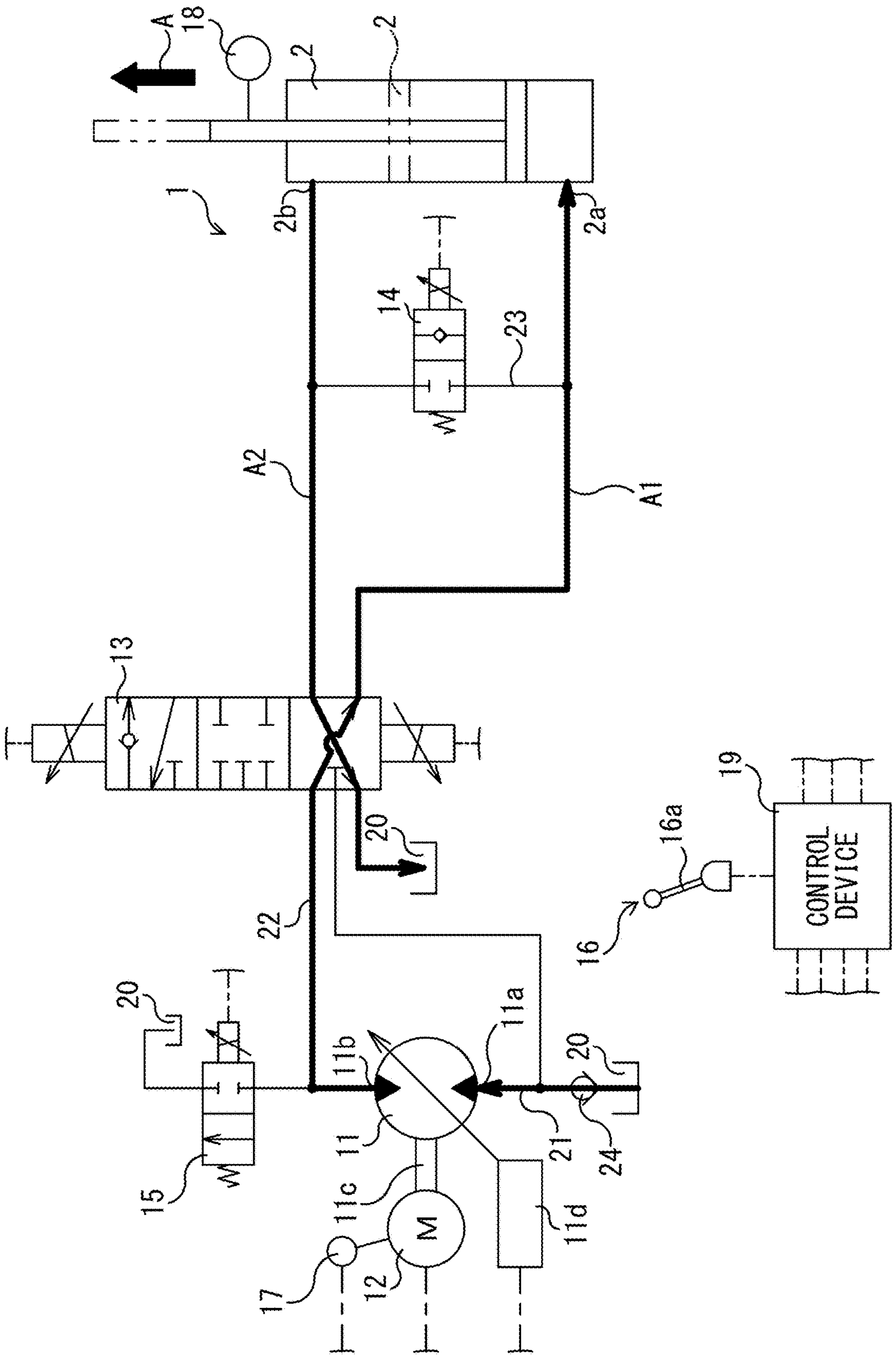
FIG. 3 is a circuit diagram illustrating the flow of a working fluid in the hydraulic drive device illustrated in FIG. 1, when a boom cylinder is extended.

In Step S2, which is a boom cylinder extension step, the control device 19 extends the boom cylinder 2. More specifically, the control device 19 operates the directional control valve 13 according to the operation signal. For example, the control device 19 outputs the operation command corresponding to the operation signal to the directional control valve 13. Accordingly, the directional control valve 13 connects the discharge port 11*b* to the head-end port 2*a* and connects the rod-end port 2*b* to the tank 20, as illustrated in FIG. 3. Note that in the directional control valve 13, the opening degree between the discharge port 11*b* and the head-end port 2*a* is a full opening degree in the present embodiment. Meanwhile, the directional control valve 13 cuts off the suction port 11*a* from the head-end port 2*a* and the rod-end port 2*b*. Furthermore, the control device 19 outputs the rotational speed command and the capacity command that correspond to the operation signal. As a result, the hydraulic pump motor 11 discharges the working fluid from the discharge port 11*b* at a flow rate corresponding to the operation signal. The working fluid discharged is brought to the head-end port 2*a* via the directional control valve 13 (the arrow A1 in FIG. 3). Meanwhile, the working fluid is drained from the rod-end port 2*b* to the tank 20 via the directional control valve 13 (the arrow A2 in FIG. 3). As a result, the boom cylinder 2 is extended at a speed corresponding to the operation signal (refer to the arrow A and the dash-dot-dot line in FIG. 3). Thus, the boom can be raised at a speed corresponding to the operation signal. Subsequently, when the boom raising operation ends, the control device 19 ends the boom cylinder extraction and retraction process.

Figure 4:
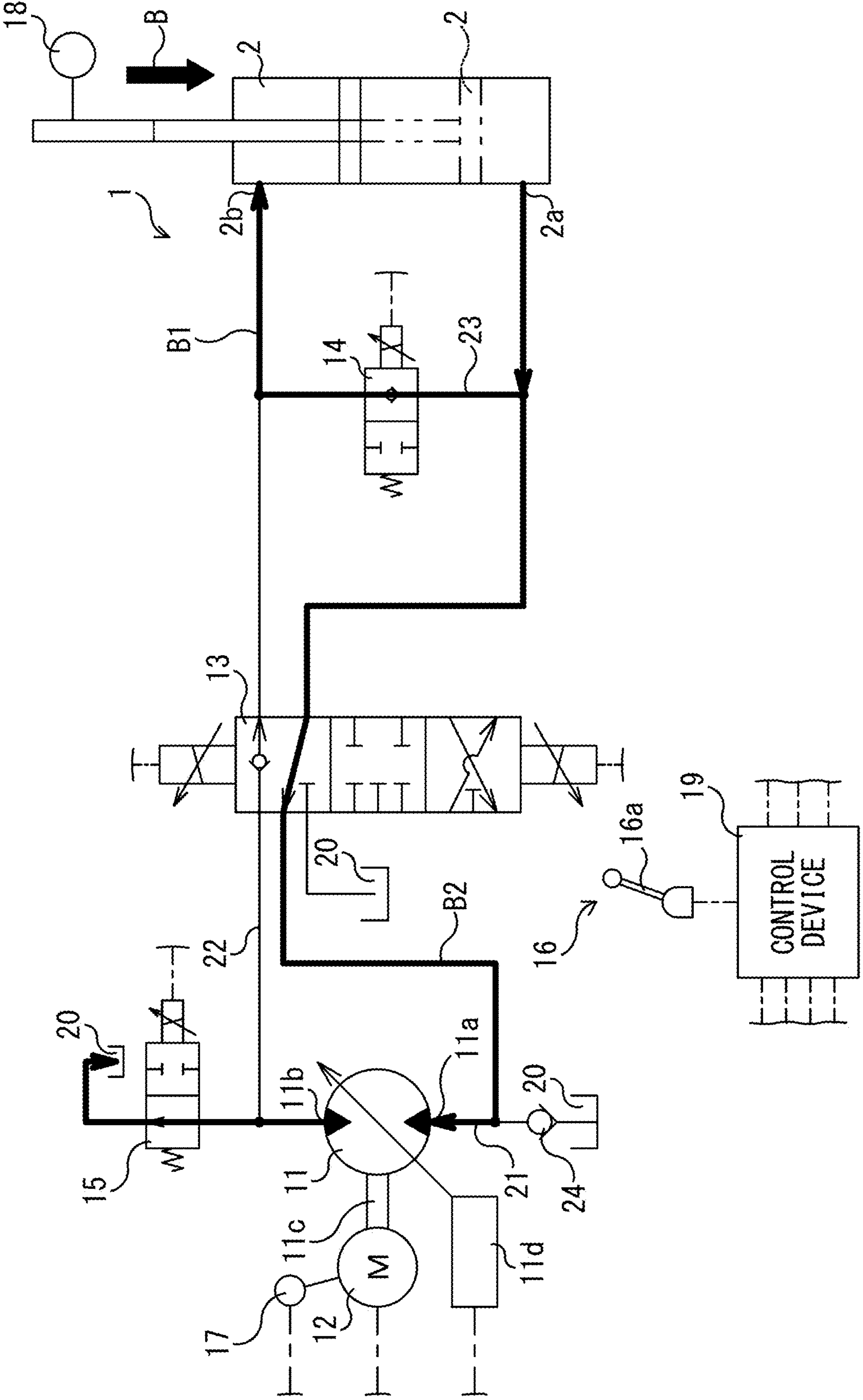
FIG. 4 is a circuit diagram illustrating the flow of a working fluid in the hydraulic drive device illustrated in FIG. 1, when a boom cylinder is retracted.

In Step S3, which is a boom cylinder retraction step, the control device 19 retracts the boom cylinder 2. More specifically, the control device 19 operates the directional control valve 13, the regeneration valve 14, and the unloader valve 15 according to the operation signal. For example, the control device 19 outputs the operation command corresponding to the operation signal to the directional control valve 13. Accordingly, the control device 19 causes the directional control valve 13 to connect the head-end port 2*a* to the suction port 11*a*, as illustrated in FIG. 4. Furthermore, the control device 19 outputs the regeneration command to the regeneration valve 14. Accordingly, the control device 19 causes the regeneration valve 14 to open the regeneration passage 23. As a result, the head-end port 2*a* and the rod-end port 2*b* are placed in communication. Moreover, the control device 19 outputs the unloading command to the unloader valve 15. Accordingly, the control device 19 causes the unloader valve 15 to connect the discharge passage 22 to the tank 20. As a result, the hydraulic pump motor 11 is unloaded.

When the directional control valve 13, the regeneration valve 14, and the unloader valve 15 are operated as described above, the working fluid flows as follows. Specifically, the boom cylinder 2 is under the empty weight of the boom in the retracting direction. Therefore, the boom cylinder 2 is retracted under the empty weight of the boom. Thus, the working fluid is drained from the head-end port 2*a*. Part of the working fluid drained is supplied to the rod-end port 2*b* through the regeneration passage 23. In other words, part of the working fluid is regenerated from the head-end port 2*a* to the rod-end port 2*b* (refer to the arrow B1 in FIG. 4). Meanwhile, the remaining part is supplied to the suction port 11*a* of the hydraulic pump motor 11 via the directional control valve 13 (refer to the arrow B2 in FIG. 4). Subsequently, the remaining part rotatably drives the electric motor 12 via the hydraulic pump motor 11 and then is drained from the discharge port 11*b* to the tank 20 via the unloader valve 15. When the electric motor 12 is rotatably driven, the electric motor 12 generates electric power. As a result, the fluid energy of the remaining part is regenerated as electrical energy. In other words, the potential energy of the boom is regenerated as electrical energy. Thus, energy can be regenerated using the working fluid drained.

Furthermore, by controlling the suction flow rate at the hydraulic pump motor 11, the control device 19 retracts the boom cylinder 2 at a speed corresponding to the operation signal. More specifically, the control device 19 outputs the rotational speed command and the capacity command that correspond to the operation signal. Accordingly, the hydraulic pump motor 11 can cause the working fluid to flow into the suction port 11*a* at a flow rate corresponding to the operation signal; thus, the flow rate of the working fluid that is drained from the head-end port 2*a* of the boom cylinder 2 can be controlled and set to the flow rate corresponding to the operation signal. As a result, the flow rate of the working fluid that is regenerated to the rod-end port 2*b* can be controlled and set to the flow rate corresponding to the operation signal and therefore, the boom cylinder 2 can be retracted at a speed corresponding to the operation signal (refer to the arrow B and the dash-dot-dot line in FIG. 4). Thus, the boom can be lowered at a speed corresponding to the operation signal. When the boom cylinder 2 is retracted according to the boom lowering operation, the processing proceeds to Step S4.

Note that the control device 19 performs the following feedback control in the boom lowering operation. Specifically, the control device 19 changes the suction flow rate at the hydraulic pump motor 11 according to the measurement result of the stroke sensor 18. More specifically, the control device 19 changes the suction flow rate at the hydraulic pump motor 11 by outputting the capacity command and the rotational speed command according to the measurement result of the stroke sensor 18. In this manner, the control device 19 performs the feedback control of the speed of the boom cylinder 2. This leads to a reduced occurrence of hunting in the boom cylinder 2.

In Step S4, which is a first coil temperature determination step, the control device 19 determines whether a coil temperature T of the electric motor 12 is higher than or equal to a first predetermined temperature T1. More specifically, the control device 19 estimates the coil temperature T on the basis of the temperature of the casing measured by the temperature sensor 17. Subsequently, the control device 19 determines whether the coil temperature T is higher than or equal to the first predetermined temperature T1. When the coil temperature T is lower than the first predetermined temperature T1, the processing proceeds to Step S5. On the other hand, when the coil temperature T is higher than or equal to the first predetermined temperature T1, the processing proceeds to Step S6.

In Step S5, which is a first opening degree control step, the control device 19 controls the opening degree of the regeneration valve 14 according to the coil temperature T. More specifically, the control device 19 sets an opening degree R of the regeneration valve 14 to at least a predetermined first regeneration opening degree R1, for example, a full opening degree. Furthermore, the control device 19 sets the opening degree between the head-end port 2*a* and the suction port 11*a*, that is, an opening degree D of the directional control valve 13, to at least a predetermined first regeneration opening degree D1, for example, a full opening degree. By placing the regeneration valve 14 and the directional control valve 13 in fully open states in this manner, it is possible to minimize the occurrence of pressure losses in the working fluid, meaning that more energy can be regenerated as electrical energy. Note that each of the first regeneration opening degree R1 and the first regeneration opening degree D1 does not necessarily need to be the full opening degree; it is sufficient that each of the first regeneration opening degree R1 and the first regeneration opening degree D1 be at least 85% of the full opening degree. Subsequently, when the boom lowering operation ends, the control device 19 ends the boom cylinder extraction and retraction process.

In Step S6, which is a second coil temperature determination step, the control device 19 determines whether the coil temperature T of the electric motor 12 is higher than or equal to a second predetermined temperature T2. More specifically, the control device 19 determines whether the coil temperature T estimated in Step S4 is higher than or equal to the second predetermined temperature T2 (>the first predetermined temperature T1). When the coil temperature T is lower than the second predetermined temperature T2, the processing proceeds to Step S7. On the other hand, when the coil temperature T is higher than or equal to the second predetermined temperature T2, the processing proceeds to Step S8.

In Step S7, which is a second opening degree control step, the control device 19 reduces the opening degree of the regeneration valve 14. More specifically, the control device 19 reduces the opening degree R of the regeneration valve 14 from the first regeneration opening degree R1. In other words, the control device 19 reduces the opening degree R of the regeneration valve 14 to a second regeneration opening degree R2 (an opening degree that is, for example, 50% or more and less than 85% of the opening degree in the fully open state). As a result, a pressure loss occurs in the working fluid flowing in the hydraulic drive device 1. Therefore, the fluid energy of the working fluid to be supplied to the hydraulic pump motor 11 can be reduced. Note that the second regeneration opening degree R2 is not limited to the aforementioned numerical range; it is sufficient that the second regeneration opening degree R2 be less than the first regeneration opening degree R1.

Furthermore, the control device 19 reduces the opening degree of the directional control valve 13. More specifically, the control device 19 reduces the opening degree D of the directional control valve 13 from the first regeneration opening degree D1. In other words, the control device 19 reduces the opening degree D of the directional control valve 13 to a second regeneration opening degree D2 (an opening degree that is, for example, 50% or more and less than 85% of the opening degree in the fully open state). As a result, it is possible to cause a pressure loss in the working fluid to be supplied to the hydraulic pump motor 11 while minimizing the reduction in the hydraulic pressure of the working fluid to be supplied to the rod-end port 2*b*. Therefore, the fluid energy of the working fluid to be supplied to the hydraulic pump motor 11 can be reduced. Note that the second regeneration opening degree D2 is not limited to the aforementioned numerical range; it is sufficient that the second regeneration opening degree D2 be less than the first regeneration opening degree D1.

In this manner, in the hydraulic drive device 1, the fluid energy of the working fluid is reduced using the regeneration valve 14 and the directional control valve 13. This allows for a reduction in energy to be regenerated using the electric motor 12. Thus, it is possible to prevent an excessive increase in the coil temperature of the electric motor 12. After the opening degrees of the regeneration valve 14 and the directional control valve 13 are reduced, the control device 19 ends the boom cylinder extraction and retraction process when the boom lowering operation ends.

In Step S8, which is a third opening degree control step, the control device 19 further reduces the opening degree of the regeneration valve 14. More specifically, the control device 19 reduces the opening degree R of the regeneration valve 14 to a regeneration lower limit value RU. The regeneration lower limit value RU is the lower limit value of the opening degree R during regeneration. In the present embodiment, the regeneration lower limit value RU is an opening degree that is approximately 50% of the opening degree in the fully open state. Note that the regeneration lower limit value RU is not limited to the aforementioned numerical range; it is sufficient that the regeneration lower limit value RU be an opening degree that is 20% or more and less than 50% of the opening degree in the fully open state. As a result, it is possible to cause a significant pressure loss in the working fluid flowing in the hydraulic drive device 1 and therefore, the fluid energy of the working fluid to be supplied to the hydraulic pump motor 11 can be reduced.

Furthermore, the control device 19 further reduces the opening degree of the directional control valve 13. More specifically, the control device 19 causes the directional control valve 13 to reduce the opening degree D of the directional control valve 13 to a regeneration lower limit value DU. The regeneration lower limit value DU is the lower limit value of the opening degree D during regeneration. In the present embodiment, the regeneration lower limit value DU is an opening degree that is approximately 50% of the opening degree in the fully open state. Note that the regeneration lower limit value DU is not limited to the aforementioned numerical range; it is sufficient that the regeneration lower limit value DU be an opening degree that is 20% or more and less than 50% of the opening degree in the fully open state. As a result, it is possible to cause a pressure loss in the working fluid to be supplied to the hydraulic pump motor 11 while minimizing the reduction in the hydraulic pressure of the working fluid to be supplied to the rod-end port 2*b*. Therefore, the fluid energy of the working fluid to be supplied to the hydraulic pump motor 11 can be reduced.

In this manner, in the hydraulic drive device 1, the fluid energy of the working fluid is further reduced using the regeneration valve 14 and the directional control valve 13. This allows for a further reduction in energy to be regenerated using the electric motor 12. Thus, it is possible to further prevent an excessive increase in the coil temperature of the electric motor 12. After the opening degrees R, D of the regeneration valve 14 and the directional control valve 13 are reduced to the lower limit values RU, DU, the control device 19 ends the boom cylinder extraction and retraction process when the boom lowering operation ends.

Note that the control device 19 controls the pump capacity of the hydraulic pump motor 11 and the rotational speed of the electric motor 12 according to the coil temperature during regeneration. More specifically, according to the estimated coil temperature, the control device 19 limits the capacity command and the rotational speed command to be output. Thus, each of the pump capacity of the hydraulic pump motor 11 and the rotational speed of the electric motor 12 is limited. As a result, the suction flow rate at the hydraulic pump motor 11 can be reduced. This allows for a reduction in the amount of energy to be regenerated using the electric motor 12 during regeneration. Therefore, it is possible to prevent an excessive increase in the coil temperature.

In the hydraulic drive device 1 according to the present embodiment, the opening degree of the regeneration valve 14 is controlled according to the coil temperature. Therefore, it is possible to cause an energy loss at the regeneration valve 14 before the coil temperature increases excessively by energy regeneration. This prevents an excessive increase in the coil temperature of the electric motor 12.

Furthermore, in the hydraulic drive device 1 according to the present embodiment, when the coil temperature T is higher than or equal to the first predetermined temperature T1, the control device 19 reduces the opening degree R of the regeneration valve 14. Therefore, it is possible to cause an energy loss during regeneration. Accordingly, it is possible to reduce the load on the coil during regeneration. Thus, the increase in the coil temperature is reduced. On the other hand, when the coil temperature T is lower than the first predetermined temperature T1, the opening degree of the regeneration valve 14 remains large, making it possible to reduce the energy loss during regeneration. Thus, the regeneration efficiency in the hydraulic drive device 1 can be maintained at a high level.

Furthermore, in the hydraulic drive device 1 according to the present embodiment, when the coil temperature is higher than or equal to the predetermined value, the control device 19 reduces the opening degree of the directional control valve 13. Therefore, it is possible to cause a pressure loss. This allows for a reduction in the load on the electric motor 12 during regeneration. Thus, the increase in the coil temperature is reduced. On the other hand, when the coil temperature is lower than the predetermined value, the opening degree of the directional control valve 13 remains large, making it possible to reduce the pressure loss during regeneration. Thus, the regeneration efficiency in the hydraulic drive device 1 can be maintained at a high level.

Furthermore, in the hydraulic drive device 1 according to the present embodiment, the control device 19 controls the rotational speed of the electric motor 12 according to the coil temperature. Therefore, it is possible to reduce the suction flow rate at the hydraulic pump motor 11 by reducing the rotational speed of the electric motor 12. Accordingly, it is possible to reduce the amount of energy regeneration in the electric motor 12; thus, the increase in the coil temperature is reduced.

Furthermore, in the hydraulic drive device 1 according to the present embodiment, the control device 19 controls the pump capacity of the hydraulic pump motor 11 according to the coil temperature. Therefore, it is possible to reduce the suction flow rate at the hydraulic pump motor 11 by reducing the pump capacity of the hydraulic pump motor 11. Accordingly, it is possible to reduce the amount of energy regeneration in the electric motor 12; thus, the increase in the coil temperature is reduced.

Furthermore, in the hydraulic drive device 1 according to the present embodiment, the control device 19 actuates the unloader valve 15 when regeneration is performed using the electric motor 12. Therefore, it is possible to reduce the increase in discharge pressure at the hydraulic pump motor 11. Thus, the regeneration efficiency in the electric motor 12 can be maintained at a high level.

Furthermore, in the hydraulic drive device 1 according to the present embodiment, the suction flow rate at the hydraulic pump motor 11 is changed according to the measurement result of the stroke sensor 18, and thus the feedback control of the operation speed or the acceleration of the boom cylinder 2 is performed. Therefore, the occurrence of hunting in the boom cylinder 2 is reduced.

Embodiment 2

A hydraulic drive device 1A according to Embodiment 2 is similar in configuration to the hydraulic drive device 1 according to Embodiment 1. Therefore, the configuration of the hydraulic drive device 1A according to Embodiment 2 will be described focusing on differences from the hydraulic drive device 1 according to Embodiment 1; elements that are the same as those of the hydraulic drive device 1 according to Embodiment 1 share the same reference signs, and as such, description of the elements will be omitted.

Figure 5:
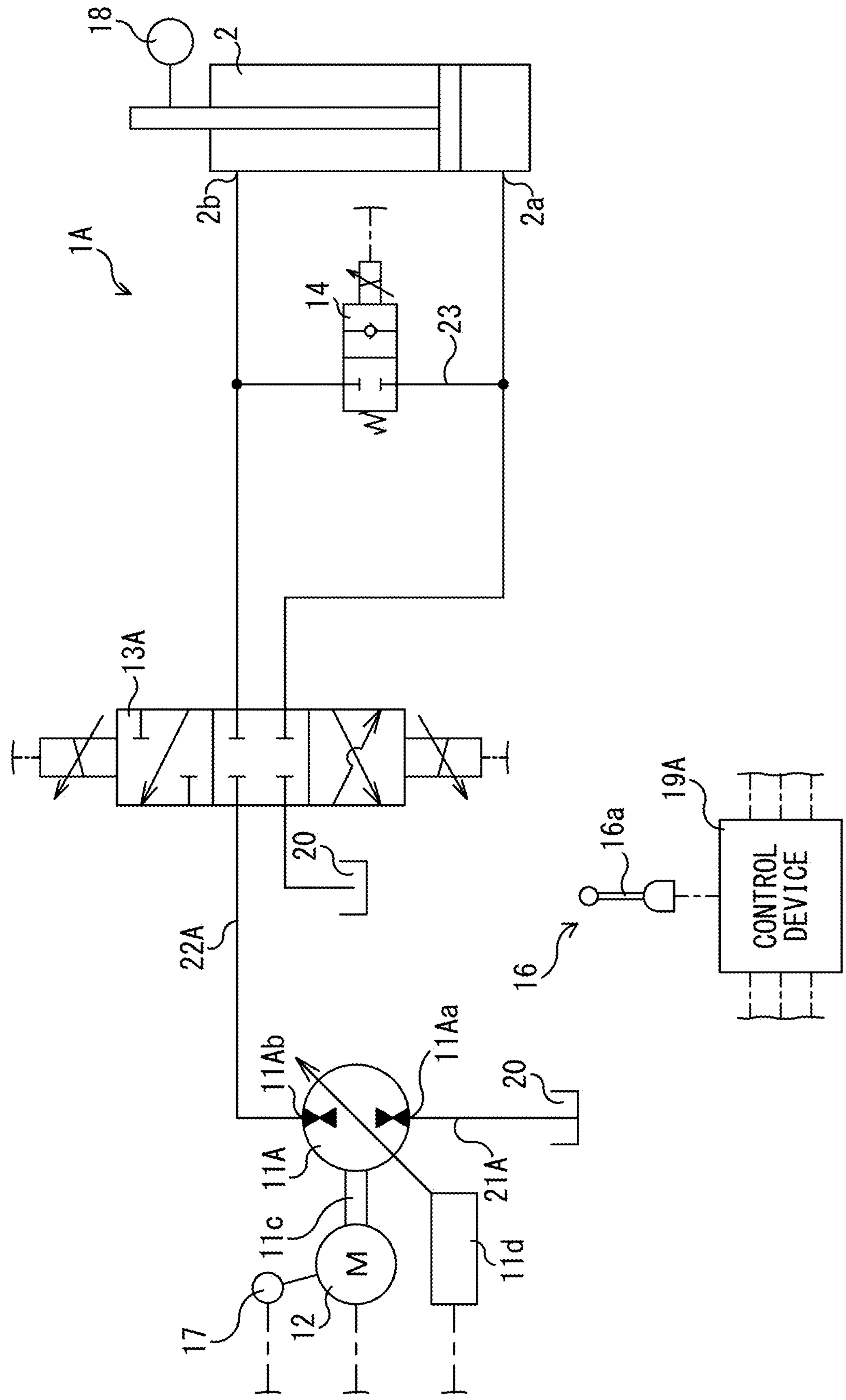
FIG. 5 is a circuit diagram illustrating the configuration of a hydraulic drive device according to Embodiment 2 of the present disclosure.

The hydraulic drive device 1A according to Embodiment 2, which is illustrated in FIG. 5, includes a hydraulic pump motor 11A, the electric motor 12, a directional control valve 13A, and the regeneration valve 14. Furthermore, the hydraulic drive device 1A includes the operation device 16, the temperature sensor 17, the stroke sensor 18, and a control device 19A.

<Hydraulic Pump Motor>

The hydraulic pump motor 11A includes a first port 11Aa, a second port 11Ab, and the shaft 11*c*. The first port 11Aa is connected to the tank 20 via a tank passage 21A. The second port 11Ab is connected to a pump passage 22A. When the shaft 11*c* is rotatably driven forward, the hydraulic pump motor 11A draws in the working fluid through the first port 11Aa and discharges the working fluid from the second port 11Ab. On the other hand, when the working fluid is supplied to the second port 11Ab, the hydraulic pump motor 11A rotates the shaft 11*c* backward. Subsequently, the hydraulic pump motor 11A drains the working fluid from the first port 11Aa. In the present embodiment, the hydraulic pump motor 11A, which is a swash plate pump of the variable capacity type, includes the regulator 11*d*.

<Directional Control Valve>

The directional control valve 13A switches the direction of the working fluid flowing between the hydraulic pump motor 11A and the head-end port 2*a*. The directional control valve 13A is connected to the second port 11Ab of the hydraulic pump motor 11A via the pump passage 22A. Furthermore, the directional control valve 13A is connected to the head-end port 2*a* and the rod-end port 2*b* of the boom cylinder 2. Moreover, the directional control valve 13A is connected to the tank 20.

When the operation command is input to the directional control valve 13A, the directional control valve 13A connects the second port 11Ab to the head-end port 2*a*. Furthermore, the directional control valve 13A opens and closes the path between the rod-end port 2*b* and the tank 20 according to the operation command that is input to the directional control valve 13A. Thus, the directional control valve 13A can switch the direction of the working fluid flowing between the hydraulic pump motor 11A and the head-end port 2*a*. When causing the working fluid to flow from the head-end port 2*a* to the second port 11Ab, the directional control valve 13A controls the opening degree between the head-end port 2*a* and the second port 11Ab (that is, the opening degree of the directional control valve 13A) according to the operation command. In the present embodiment, the directional control valve 13A is an electric spool valve. Note that the directional control valve 13A is not limited to the electric spool valve.

<Control Device>

The control device 19A controls the operation of each of the directional control valve 13A and the regeneration valve 14 according to an operation signal that is input to the control device 19A, as with the control device 19 according to Embodiment 1. Furthermore, the control device 19A changes the discharge flow rate and the suction flow rate at the hydraulic pump motor 11A according to the measurement result of the stroke sensor 18 in the present embodiment. Furthermore, the control device 19A controls the opening degree of each of the directional control valve 13A and the regeneration valve 14 according to the coil temperature measured by the temperature sensor 17.

<Operation of Hydraulic Drive Device>

In the hydraulic drive device 1A, when the operation device 16 is operated (in the present embodiment, when the operation lever 16*a* is operated), the boom cylinder extension and retraction process is performed as in the hydraulic drive device 1 according to Embodiment 1. The boom cylinder extension and retraction process performed by the control device 19A is similar to the boom cylinder extension and retraction process performed by the control device 19 according to Embodiment 1. Hereinafter, the boom cylinder extension and retraction process performed by the control device 19A will be described focusing on differences from the boom cylinder extension and retraction process performed by the control device 19 according to Embodiment 1.

In Step S2, which is the boom cylinder extension step, the control device 19A extends the boom cylinder 2. More specifically, the control device 19A operates the directional control valve 13A according to the operation signal. For example, the control device 19A outputs the operation command corresponding to the operation signal to the directional control valve 13A. Accordingly, the directional control valve 13A connects the second port 11Ab to the head-end port 2*a* and connects the rod-end port 2*b* to the tank 20. Furthermore, the control device 19A outputs the rotational speed command and the capacity command that correspond to the operation signal. As a result, the hydraulic pump motor 11A discharges the working fluid from the second port 11Ab at a flow rate corresponding to the operation signal. Thus, the boom can be raised at a speed corresponding to the operation signal. Subsequently, when the boom raising operation ends, the control device 19A ends the boom cylinder extraction and retraction process.

In Step S3, which is the boom cylinder retraction step, the control device 19A retracts the boom cylinder 2. More specifically, the control device 19A operates the directional control valve 13A and the regeneration valve 14 according to the operation signal. For example, the control device 19A outputs the operation command corresponding to the operation signal to the directional control valve 13A. Thus, the control device 19A causes the directional control valve 13A to connect the head-end port 2*a* to the second port 11Ab and cuts off the path between the rod-end port 2*b* and the tank 20. Furthermore, the control device 19A outputs the regeneration command to the regeneration valve 14, causing the regeneration valve 14 to open the regeneration passage 23. As a result, in the boom cylinder 2 under the empty weight of the boom in the retracting direction, the working fluid is pushed out through the head-end port 2*a*. Part of the working fluid pushed out is regenerated to the rod-end port 2*b*. The remaining part is brought to the hydraulic pump motor 11A. Subsequently, energy is regenerated in the electric motor 12. Furthermore, similar to the control device 19 according to Embodiment 1, the control device 19A controls the suction flow rate to retract the boom cylinder 2 at a speed corresponding to the operation signal, and performs the feedback control of the speed or the acceleration of the boom cylinder 2 according to the measurement result of the stroke sensor 18. When the boom cylinder 2 is retracted according to the boom lowering operation in this manner, the processing transitions to Step S4.

The hydraulic drive device 1A according to the present embodiment produces substantially the same advantageous effects as those produced by the hydraulic drive device 1 according to Embodiment 1.

Other Embodiments

In the hydraulic drive devices 1, 1A according to the present embodiments, the hydraulic cylinder that supplies the working fluid may be hydraulic cylinders other than the boom cylinder 2 such as an arm cylinder and a lift cylinder, for example. The directional control valves 13, 13A and the regeneration valve 14 do not necessarily need to both have adjustable opening degrees; it is sufficient that at least one of the directional control valves 13, 13A and the regeneration valve 14 be configured so that the opening degree thereof can be adjusted. When the coil temperature increases excessively, the control devices 19, 19A do not necessarily need to reduce the opening degrees of both of the directional control valve 13 and the regeneration valve 14. It is sufficient that the control devices 19, 19A reduce the opening degree of at least one of the directional control valve 13 and the regeneration valve 14. Furthermore, the control devices 19, 19A may selectively reduce the opening degrees of the directional control valves 13, 13A and the regeneration valve 14 according to the coil temperature. For example, according to an increase in the coil temperature, the control devices 19, 19A first reduce the opening degree of the regeneration valve 14, and then reduce the opening degrees of the directional control valves 13, 13A. Furthermore, when the coil temperature increases excessively, the control devices 19, 19A do not necessarily need to limit the pump capacities of the hydraulic pump motors 11, 11A and the rotational speed of the electric motor 12. Moreover, the control devices 19, 19A do not necessarily need to perform the feedback control of the speed of the boom cylinder 2. In addition, the drive source for the hydraulic pump motors 11, 11A is not limited to the electric motor 12 and may be a hybrid drive source that uses the electric motor 12 and an engine.

Exemplary Embodiments

A hydraulic drive device according to the first aspect drives a hydraulic cylinder by supplying and draining a working fluid to and from each of a head-end port and a rod-end port of the hydraulic cylinder and includes: a hydraulic pump motor that discharges the working fluid and is rotatably driven by the working fluid supplied to the hydraulic pump motor; an electric motor connected to the hydraulic pump motor; a directional control valve that switches a direction of the working fluid flowing between the hydraulic pump motor and the head-end port; a regeneration valve that opens and closes a regeneration passage connecting the head-end port and the rod-end port; a temperature sensor that measures a coil temperature of the electric motor; and a control device that controls an operation of each of the directional control valve and the regeneration valve. The control device controls an opening degree of the regeneration valve according to the coil temperature measured by the temperature sensor when causing the regeneration valve to open the regeneration passage and causing the directional control valve to connect the head-end port and the hydraulic pump motor.

According to this aspect, the opening degree of the regeneration valve is controlled according to the coil temperature. Therefore, it is possible to cause an energy loss at the regeneration valve before the coil temperature increases excessively by energy regeneration. This prevents an excessive increase in the coil temperature of the electric motor.

As a hydraulic drive device according to the second aspect, in the hydraulic drive device according to the first aspect, when the coil temperature measured by the temperature sensor is higher than or equal to a predetermined temperature, the control device may reduce the opening degree of the regeneration valve.

According to this aspect, when the coil temperature is higher than or equal to the predetermined temperature, the control device reduces the opening degree of the regeneration valve. Therefore, it is possible to cause an energy loss during regeneration. Accordingly, it is possible to reduce the load on the coil during regeneration. Thus, the increase in the coil temperature is reduced. On the other hand, when the coil temperature is lower than the predetermined temperature, the opening degree of the regeneration valve remains large, making it possible to reduce the energy loss during regeneration. Thus, the regeneration efficiency in the hydraulic drive device can be maintained at a high level.

As a hydraulic drive device according to the third aspect, in the hydraulic drive device according to the first or second aspect, when the coil temperature measured by the temperature sensor is higher than or equal to a predetermined temperature, the control device may cause the directional control valve to reduce an opening degree between the head-end port and the hydraulic pump motor.

According to this aspect, when the coil temperature is higher than or equal to the predetermined value, the control device reduces the opening degree of the directional control valve. Therefore, it is possible to cause a pressure loss. This allows for a reduction in the load on the electric motor during regeneration. Thus, the increase in the coil temperature is reduced. On the other hand, when the coil temperature is lower than the predetermined temperature, the opening degree of the directional control valve remains large, making it possible to reduce the pressure loss during regeneration. Thus, the regeneration efficiency in the hydraulic drive device can be maintained at a high level.

As a hydraulic drive device according to the fourth aspect, in the hydraulic drive device according to any one of the first to third aspects, the control device may control a rotational speed of the electric motor according to the coil temperature measured by the temperature sensor.

According to this aspect, the control device controls the rotational speed of the electric motor according to the coil temperature. Therefore, it is possible to reduce the suction flow rate at the hydraulic pump motor by reducing the rotational speed of the electric motor. Accordingly, it is possible to reduce the amount of energy regeneration in the electric motor; thus, the increase in the coil temperature is reduced.

As a hydraulic drive device according to the fifth aspect, in the hydraulic drive device according to any one of the first to fourth aspects, a pump capacity of the hydraulic pump motor may be changeable; and the control device may control the pump capacity of the hydraulic pump motor according to the coil temperature measured by the temperature sensor.

According to this aspect, the control device controls the pump capacity of the hydraulic pump motor according to the coil temperature. Therefore, it is possible to reduce the suction flow rate at the hydraulic pump motor by reducing the pump capacity of the hydraulic pump motor. Accordingly, it is possible to reduce the amount of energy regeneration in the electric motor; thus, the increase in the coil temperature is reduced.

As a hydraulic drive device according to the sixth aspect, the hydraulic drive device according to any one of the first to fifth aspects may further include an unloader valve, the hydraulic pump motor may include a discharge port through which the working fluid is discharged and a suction port through which the working fluid is drawn in, the directional control valve may switch a connection target of the head-end port between the discharge port and the suction port, the unloader valve may connect, to a tank, a discharge passage connecting the discharge port and the directional control valve, and the control device may actuate the unloader valve when causing the directional control valve to connect the head-end port to the suction port.

According to this aspect, the control device actuates the unloader valve when regeneration is performed using the electric motor. Therefore, it is possible to reduce the increase in discharge pressure at the hydraulic pump motor. Thus, the regeneration efficiency in the electric motor can be maintained at a high level.

As a hydraulic drive device according to the seventh aspect, the hydraulic drive device according to any one of the first to sixth aspects may further include a speed-related sensor that measures an operation speed of the hydraulic cylinder, and the control device may perform feedback control of the operation speed or an acceleration of the hydraulic cylinder by changing a suction flow rate at the hydraulic pump motor according to a measurement result of the speed-related sensor.

According to this aspect, the suction flow rate at the hydraulic pump motor is changed according to the measurement result of the stroke sensor, and thus the feedback control of the operation speed or the acceleration of the boom cylinder is performed. Therefore, the occurrence of hunting in the boom cylinder is reduced.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

The invention claimed is:

1. A hydraulic drive device that drives a hydraulic cylinder by supplying and draining a working fluid to and from each of a head-end port and a rod-end port of the hydraulic cylinder, the hydraulic drive device comprising:

a hydraulic pump motor that discharges the working fluid and is rotatably driven by the working fluid supplied to the hydraulic pump motor;

an electric motor connected to the hydraulic pump motor;

a directional control valve that switches a direction of the working fluid flowing between the hydraulic pump motor and the head-end port;

a regeneration valve that opens and closes a regeneration passage connecting the head-end port and the rod-end port;

a temperature sensor that measures a coil temperature of the electric motor; and a control device that controls an operation of each of the directional control valve and the regeneration valve, wherein:

the control device controls an opening degree of the regeneration valve according to the coil temperature measured by the temperature sensor when causing the regeneration valve to open the regeneration passage and causing the directional control valve to connect the head-end port and the hydraulic pump motor.

2. The hydraulic drive device according to claim 1, wherein:

when the coil temperature measured by the temperature sensor is higher than or equal to a predetermined temperature, the control device reduces the opening degree of the regeneration valve.

3. The hydraulic drive device according to claim 1, wherein:

when the coil temperature measured by the temperature sensor is higher than or equal to a predetermined temperature, the control device causes the directional control valve to reduce an opening degree between the head-end port and the hydraulic pump motor.

4. The hydraulic drive device according to claim 1, wherein:

the control device controls a rotational speed of the electric motor according to the coil temperature measured by the temperature sensor.

5. The hydraulic drive device according to claim 1, wherein:

a pump capacity of the hydraulic pump motor is changeable; and the control device controls the pump capacity of the hydraulic pump motor according to the coil temperature measured by the temperature sensor.

6. The hydraulic drive device according to claim 1, further comprising:

an unloader valve, wherein:

the hydraulic pump motor includes a discharge port through which the working fluid is discharged and a suction port through which the working fluid is drawn in;

the directional control valve switches a connection target of the head-end port between the discharge port and the suction port;

the unloader valve connects, to a tank, a discharge passage connecting the discharge port and the directional control valve; and the control device actuates the unloader valve when causing the directional control valve to connect the head-end port to the suction port.

7. The hydraulic drive device according to claim 1, further comprising:

a speed-related sensor that measures an operation speed of the hydraulic cylinder, wherein:

the control device performs feedback control of the operation speed or an acceleration of the hydraulic cylinder by changing a suction flow rate at the hydraulic pump motor according to a measurement result of the speed-related sensor.

8. The hydraulic drive device according to claim 2, wherein:

when the coil temperature measured by the temperature sensor is higher than or equal to the predetermined temperature, the control device causes the directional control valve to reduce an opening degree between the head-end port and the hydraulic pump motor.

9. The hydraulic drive device according to claim 2, wherein:

the control device controls a rotational speed of the electric motor according to the coil temperature measured by the temperature sensor.

10. The hydraulic drive device according to claim 2, wherein:

a pump capacity of the hydraulic pump motor is changeable; and the control device controls the pump capacity of the hydraulic pump motor according to the coil temperature measured by the temperature sensor.

11. The hydraulic drive device according to claim 2, further comprising:

an unloader valve, wherein:

the hydraulic pump motor includes a discharge port through which the working fluid is discharged and a suction port through which the working fluid is drawn in;

the directional control valve switches a connection target of the head-end port between the discharge port and the suction port;

the unloader valve connects, to a tank, a discharge passage connecting the discharge port and the directional control valve; and the control device actuates the unloader valve when causing the directional control valve to connect the head-end port to the suction port.

12. The hydraulic drive device according to claim 2, further comprising:

a speed-related sensor that measures an operation speed of the hydraulic cylinder, wherein:

the control device performs feedback control of the operation speed or an acceleration of the hydraulic cylinder by changing a suction flow rate at the hydraulic pump motor according to a measurement result of the speed-related sensor.

* * * * *